April 18, 1950 H. O. PETERSON 2,504,348

THRESHOLD BIAS ADJUSTMENT DEVICE

Filed May 3, 1945 2 Sheets-Sheet 1

INVENTOR.
HAROLD O. PETERSON.
BY H. S. Grover
ATTORNEY.

April 18, 1950 | H. O. PETERSON | 2,504,348

THRESHOLD BIAS ADJUSTMENT DEVICE

Filed May 3, 1945 | 2 Sheets-Sheet 2

INVENTOR
Harold O. Peterson.
BY H. S. Grover
ATTORNEY

Patented Apr. 18, 1950 | 2,504,348

UNITED STATES PATENT OFFICE 2,504,348

THRESHOLD BIAS ADJUSTMENT DEVICE

Harold O. Peterson, Riverhead, N. Y., assignor to Radio Corporation of America, a corporation of Delaware Application May 3, 1945, Serial No. 591,729

5 Claims. (Cl. 250—8)

This application discloses an improved method of and means for translating pulse energy or direct current potentials which alternate between two values and represent signals.

Figure 3:
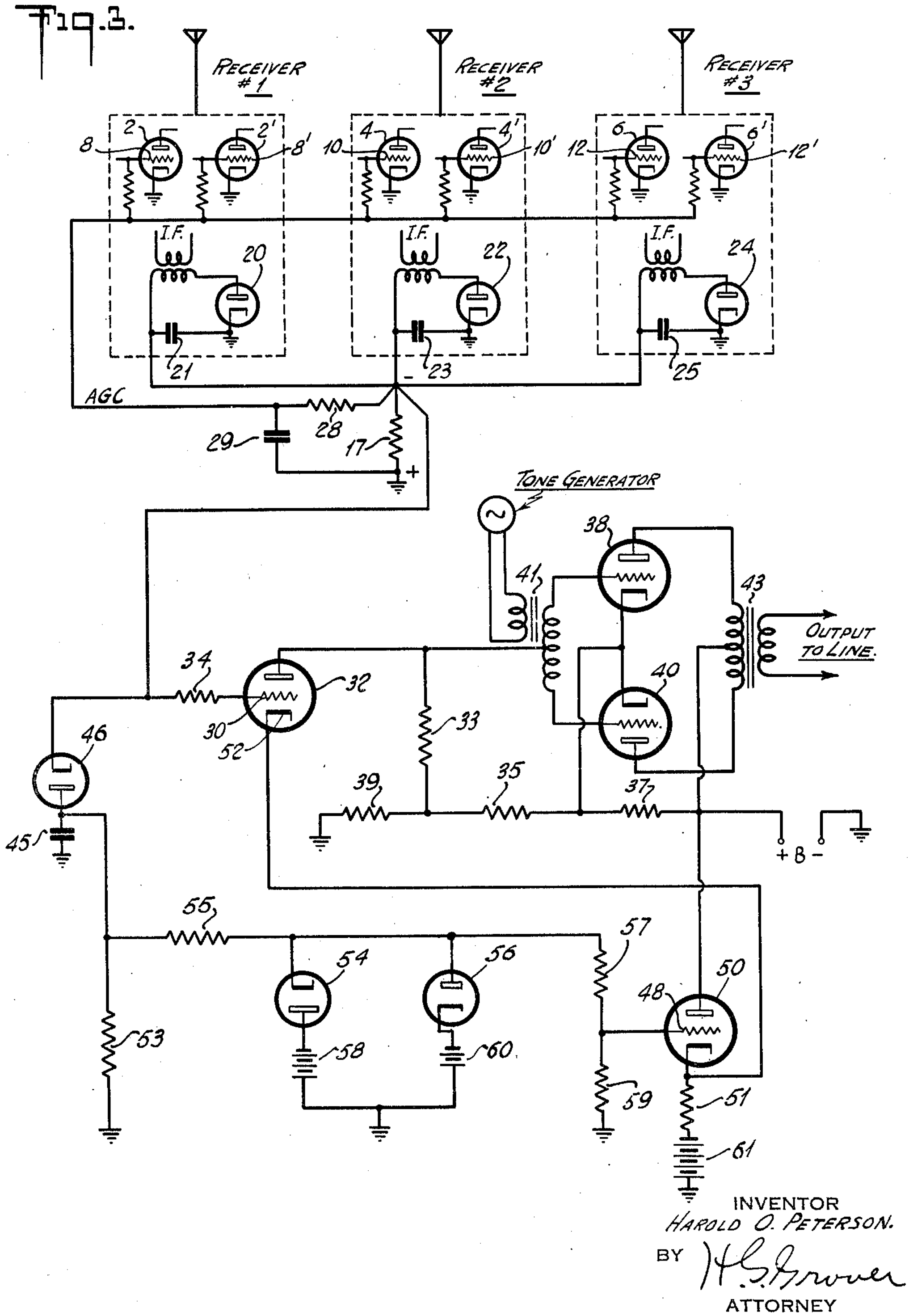

In describing my invention reference will be made to the attached drawings wherein Figs. 1*a*, 1*b*, 2*a* and 2*b* are graphs used to illustrate the need of my invention and the manner in which the same is carried out, while Fig. 3 illustrates schematically by circuit connection the essential features of a device arranged in accordance with my invention for translating pulse energy such as keyed direct current pulses.

It is frequently desirable to operate telegraph circuits and pulse circuits with a threshold bias so arranged that the output is switched full on when the pulse or telegraph character reaches approximately one-half its normal peak amplitude. For many years in my assignee's diversity telegraph receiving system wherein the rectified signal is caused to operate a tone keyer, manual adjustment for the operation described above has been made. This adjustment is for a given signal level and readjustment is necessary when the signal level changes. In these systems the output of a radio telegraphy receiver or the outputs of several radio receivers are supplied each or combined to a stage which, in the absence of receiver output representing signal marking, is biased to cut off. This stage has as excitation voltage oscillations of tone frequency and of amplitude insufficient to overcome the cutoff bias. Then when a signal marking comes through it is such as to overcome cutoff bias on the stage and a pulse of oscillatory energy of tone frequency is passed by the stage to utilization means. A tone generator controlled by received telegraphy signals has been shown in my United States application Serial #561,564, filed Nov. 2, 1944.

The primary object of the present invention is to provide a telegraphy system including automatically operative biasing means whereby the generated tone is keyed fully on or fully off as the signal passes above or below two critical values at or about one-half the maximum direct current potential representing the keyed signal in the receiver output used to control the tone source.

There are two reasons wherefore the keying action should take place within a narrow range of voltage near one-half the peak amplitude of the rectified signal. These reasons will now be described and in so doing reference will be made to the graphs of Figs. 1*a*, 1*b*, 2*a* and 2*b*.

Figures 1A, 1B, 2A, 2B:
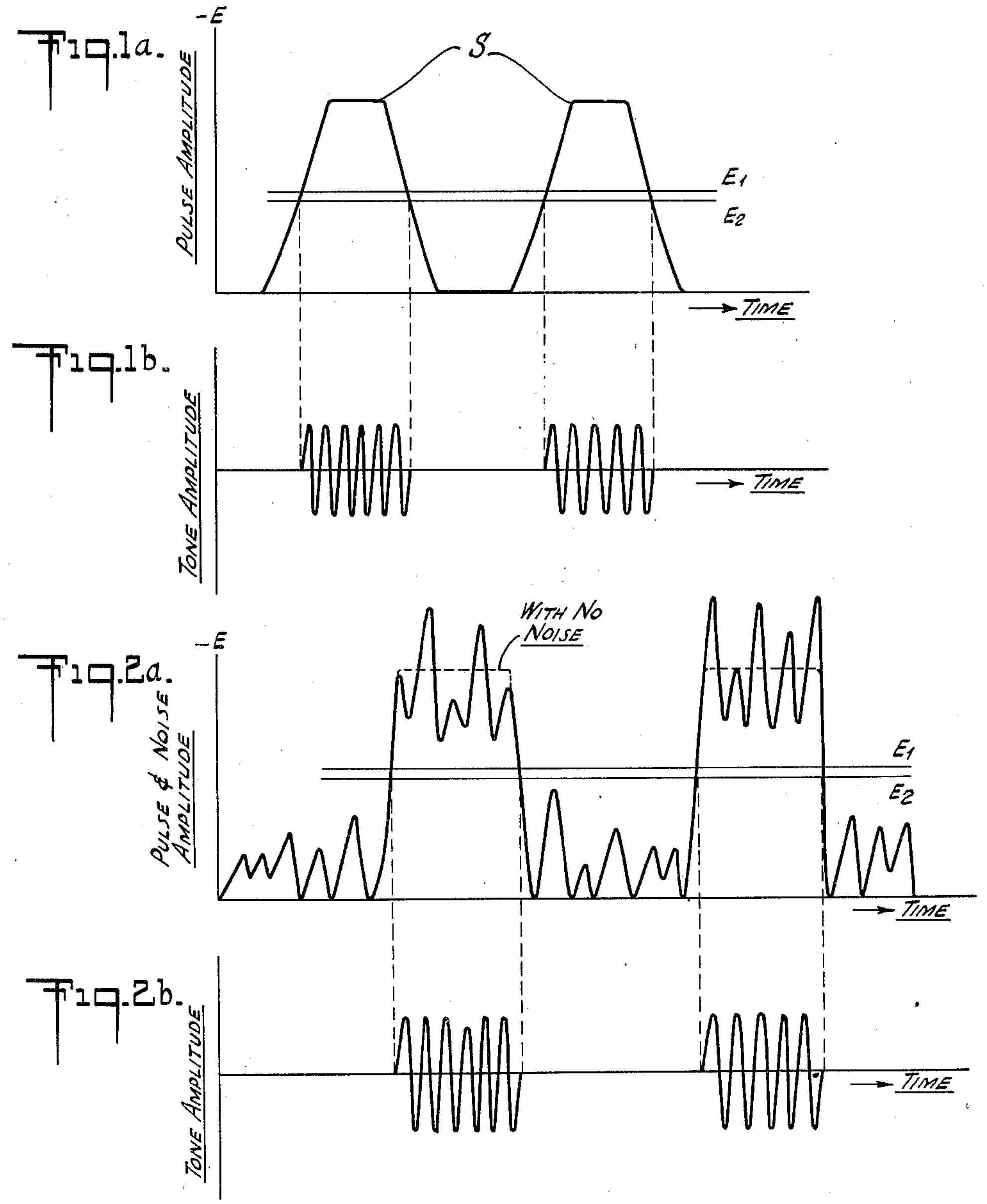

In Figs. 1*a* and 1*b* I have shown how and why operation of my system is so arranged that the threshold bias of the tone keying system is located at about one-half of the normal peak pulse amplitude of the detected telegraphy signal and full output of the keyer is then reached and how such operation tends to give normal length characters even though the received rectified signal or pulses do not build up and decay instantly. If the radio telegraph signal is passed through a filter with a narrow band width and then rectified, the rectified signal will have a characteristic similar to that shown at S in Fig. 1*a* where it takes some appreciable amount of time for the rectified voltage to reach normal steady state amplitude. It will be noted, however, that if the tone keyer operates in such a manner as to switch on and off in a narrow range of threshold voltages represented by E1 and E2 the resulting keyed tone signal will have the proper length of characters as shown in Fig. 1*b*.

Fig. 2*a* represents graphically the case when the rectified signal has noise components present in it. It will be noted that if the tone keyer is operated in a voltage range at approximately one-half of the normal peak signal level the noise components occurring during the space interval will not cause the keyer to transmit a tone and the noise components occurring during the transmitted mark character will not cause breaks in the tone keyer output.

In Fig. 3 I have shown an improved system wherein the keyer operation is caused to take place at approximately the correct signal level in spite of the fact that the keyed signal may vary somewhat in amplitude due to fading. My device, when properly adjusted, causes the keyer threshold to be situated at approximately one-half of the amplitude of the rectified signal.

In Fig. 3 there are three radio receivers #1, #2 and #3 connected to spaced antennas so as to provide reception with the benefits of space diversity. Each receiver may include the usual radio amplifiers, frequency reducers, etc., details of which are known in the radio art, and in the sake of simplicity will not be described herein. As to the make-up of these circuits see, for example, my United States Patent No. 2,302,951, dated Nov. 24, 1942. The radio frequency amplifiers or the intermediate frequency amplifier tubes 2, 2', 4, 4' and 6, 6' or some thereof are subjected at their grids 8, 8', 10, 10' and 12, 12' to automatically applied control potentials automatically produced in impedance 11 by rectifiers 20, 22 and 24. The rectifiers 20, 22 and 24 are excited by the output of the intermediate frequency amplifiers in the respective receivers. The rectifiers may be of any approved type and are shown as diodes with the cathodes grounded and the anodes connected by the secondary windings of intermediate frequency transformers and load impedance 17 to ground. Intermediate frequency bypass condensers 21, 23 and 25 complete the rectifier alternating current circuits.

As stated above the signal rectifier circuits including tubes 20, 22 and 24 feed a common load resistor 17 to which is connected a time constant circuit including resistance 28 and condenser 29. This time constant circuit is in turn connected to the bias circuits of appropriate tubes in the respective receivers to give automatic gain control simultaneously in receivers #1, #2 and #3. The output resistor 17 also feeds rectified signal voltage to the grid 30 of tube 32 through resistor 34. This tube 32 has its anode connected by a resistance 33 to a point on a resistive potentiometer including resistances 35, 37 and 39 across a source of direct current potential. The output resistance 33 is in the grid circuit of the pair of push-pull connected tubes 38 and 40. A tone generator is coupled to the primary winding of the transformer 41 the secondary winding of which is coupled differentially to the grids of tubes 38 and 40. An output circuit leading to recording apparatus is coupled by transformer 43 to the anodes of tubes 38 and 40. The tubes 38 and 40 feed tone energy to the transformer 43 when the tubes are conductive. The tube 32 is keyed by the direct current potential developed in the load resistance 17, and plate current through the resistance 33 provides a potential on the grids of tubes 38 and 40 which shifts from a negative value at which the tubes are cutoff to a less negative value at which they are conductive.

The negative rectified signal voltage developed across resistor 17 also serves to charge condenser 45 through diode 46. The charging path for this condenser is from resistance 17, through the conductance of tube 46. The discharging path for the condenser 45 is through resistor 53 to ground. The time constant of this network is made such that condenser 45 charges very rapidly (in about the length of one baud) and discharges more slowly. The time constants of resistor 53 and capacitor 45 is such that the voltage on capacitor 45 does not follow the keying representing the signal. On the other hand, the voltage on capacitor 45 does follow slower variations of signal amplitude which represents fading. The word "Baud" as used herein represents the length of one dot or one space between dots as defined more completely on pages 11–37 of Pender and McIlwain, Electrical Engineers Handbook, volume 5, 3rd edition. An appropriate fraction of the voltage across condenser 45 is fed to the grid 48 of cathode follower tube 50 in such a manner that a potential drop is developed at the cathode of tube 50 and applied to the cathode 52 of tube 32 to maintain the same at a negative potential with respect to ground, which negative potential is maintained at approximately one-half of the voltage developed by the rectified signal across resistor 17 when the key at the transmitter is in signal marking position. Usually this is "key down" condition in the transmitter. By proper choice of tube 50 and resistor 51 adjustment is made such that the plate to cathode current drawn by tube 32 has little effect on the cathode potential of this tube. That is, the current flowing to the cathode of tube 50 is large compared to the current flowing to the cathode of tube 32 so that the potential on both cathodes is primarily determined by the current flowing in tube 50. The current flowing in tube 50 is determined by the charge on condenser 45, and as set forth above, the charge on condenser 45 is determined by the potential across common diode load resistance 17.

To prevent large excursions of the cathode potential of tube 32, limits are established by peak limiting diodes 54 and 56 connected in series with bias potential sources 58 and 60 across the network between condenser 45 and the grid 48 of tube 50. This peak limiting serves to prevent paralysis of the threshold bias establishing network due to occasional bursts of static.

The operation of the keyer is in other respects similar to that of the keyer commonly used in our diversity receivers. When the grid 30 of tube 32 becomes a fraction of a volt negative with respect to its cathode 52, tube 32 reaches cutoff and reduced voltage is developed across resistor 33. For this condition tubes 38 and 40 are biased by resistors 33 and 35 for operation as an amplifier transmitting the tone induced in transformer 41 to the output circuit through transformer 43. When the grid of tube 32 reaches the same potential as its cathode 52 or becomes slightly positive with respect to its cathode tube 32 draws plate current which, flowing through resistor 33, biases the grids of tubes 38 and 40 negative past cutoff, thus interrupting the transmission of the tone induced in transformer 41.

For example, assume the direct current potential at the diode anode end of resistance 17 and at grid 30 varies from substantially 0 in the presence of space to —8 volts in the presence of mark. In the absence of marking signals in the receiver the potential at the diode end of resistance 17 and on grid 30 is about zero or positive relative to the potential on the cathode 52 of tube 32 as supplied by tube 50, and current flows in tube 32 and resistance 33 to bias tubes 38 and 40 to cutoff and no tone energy is put out by transformer 43.

Now when marking signals come in, the potential across resistance 17 grows and the potential at the grid of tube 32 swings negative. The potential on the cathode 52 of tube 32 is assumed to be about one-half of the maximum negative potential at 17 in the presence of marking or —4 volts. The network including resistances 53 and 55, diodes 54 and 56, sources 58 and 60, potentiometer resistances 57 and 59, tube 50, resistance 51, and source 61 have been made such as to produce a negative potential of say about —4 volts at the cathode 52. Thus in the presence of marking signals as the current through resistance 17 grows as does the potential drop in resistance 17, the negative bias on the grid 30 of tube 32 grows and when it reaches about —4½ volts, current through this tube 32 is cut off because its grid 30 thereafter becomes negative relative to the potential on the cathode 52. The current in resistance 33 drops to make the bias on the grids of tubes 38 and 40 less negative, and the tubes 38 and 40 become conductive to let tone energy be put out at transformer 43. When the signal mark is ended the potential at 17 drops to become less negative and as it reaches about 4½ volts negative the tube 32 again draws current to cut off tubes 38 and 40. Thus, in my system tone energy is supplied during the time at which the voltage of the rectified signal exceeds a critical value of intensity, say for example, E1.

It should be understood that the voltages from sources 58, 60 and 61 can be derived from one suitable power supply through resistance networks.

What is claimed is:

1. In a signalling system, a plurality of telegraphy receivers including a detector for each receiver and a common impedance wherein uni-directional potentials representing signals are produced, which potentials vary from a first value indicating one signalling condition to a second value indicating another signalling condition, and means actuated by said potentials for producing pulses of energy, comprising a source of energy coupled to a relay device having output electrodes coupled to an output circuit, said relay device having input electrodes, a biasing impedance connected to said input electrodes, a control tube having output electrodes including a cathode coupled to said biasing impedance, said control tube also having a control grid, means for impressing said potentials representing signals on the control grid of the control tube, and a capacitive and resistive network having an input excited by said first mentioned potentials and an output coupled to the cathode of said control tube for applying a fraction of said first mentioned potential to the cathode of said control tube, said network being shunted by a voltage peak limiter.

2. In a telegraphy system, means for rectifying telegraphy signals and deriving therefrom a direct current potential which varies between two values, one of which denotes marking condition and the other of which denotes spacing condition, a source of oscillations of tone frequency coupled with a control device having an output circuit and an input circuit including a biasing resistance, a control tube having an anode connected to its cathode through the said biasing resistance of said control device, said control tube having a control grid, means for impressing said potential on the control grid of the control tube, a diode and a condenser in series excited by said first named potential, a second electron control device having an output impedance coupled to the cathode of said control tube, a network coupling said diode to the input electrode of said second named device, and a potential peak limiting device in shunt to said network.

3. In a telegraphy system, means for rectifying telegraphy signals and deriving therefrom direct current potentials which vary between two values one of which denotes marking condition and the other of which denotes spacing condition, a source of oscillations of tone frequency coupled with an electron control device having an output circuit and having input electrodes in an input circuit including a biasing resistance, a control tube having a cathode and having an anode connected to its cathode through the biasing resistance of said control device, said control tube having a control grid, means for applying said first mentioned potentials to said control grid of said control tube, a diode and a condenser in series excited by said first named potentials, a second electron discharge tube having input electrodes and having a cathode coupled to ground by an impedance, a connection between the cathode of said second tube and the cathode of said control tube, a network coupling said condenser to the input electrodes of said second tube, and a full wave peak limiting diode arrangement in shunt to said network.

4. In a telegraphy system, means for rectifying telegraphy signals and passing the rectified signals through an impedance to produce therein direct current potentials which vary between two values one of which denotes marking condition and the other of which denotes spacing condition, a source of oscillations of tone frequency coupled with an electron control device having an output circuit and input electrodes, an input circuit including a resistance which normally biases said device to cutoff connected to said input electrodes, a control tube having a cathode and having an anode connected to its cathode through the biasing resistance of said control device and a source of potential, said control tube having a control grid, means for applying said first mentioned potentials to said control grid, a diode and a condenser in series in shunt to said first mentioned impedance, a second electron control device having input electrodes and having output electrodes in series with an impedance and a source of potential, a connection between said last named impedance and the cathode of said control tube, a network coupling said condenser to the input electrodes of said second device, and a full wave peak limiting diode arrangement in shunt to said network.

5. In a signalling system, an impedance wherein recurring uni-directional potentials representing signals appear, which potentials vary from a first value indicating one signalling condition to a second value indicating another signalling condition, means actuated by said potentials for producing pulses of energy, a control grid, a cathode and an anode, a second impedance in a circuit between said anode and cathode, a diode rectifier and a condenser in series in shunt to said first named impedance, a second tube having a control grid and having a cathode coupled directly to the cathode of said first tube, a third impedance and a source of potential connecting the cathode of said second tube to ground, means for impressing said potentials representing signals from said first impedance on the control grid of the control tube, a fourth impedance in shunt to said condenser, a coupling between said fourth impedance and the control grid of said second tube, and a tone generator the effectiveness of which is controlled by the potential developed in said second impedance.

HAROLD O. PETERSON.

REFERENCES CITED

The following references are of record in the file of this patent:

UNITED STATES PATENTS

| Number | Name | Date |
|---|---|---|
| 2,117,664 | Holst | May 17, 1938 |
| 2,250,550 | Peterson et al. | July 29, 1941 |
| 2,253,832 | Whitaker | Aug. 26, 1941 |
| 2,383,126 | Hollingsworth | Aug. 21, 1945 |